United States Patent

Wenzlawski et al.

[11] Patent Number: 5,934,256
[45] Date of Patent: Aug. 10, 1999

[54] METHOD FOR DETECTING IRREGULAR COMBUSTION PROCESSES IN A MULTICYLINDER DIESEL INTERNAL COMBUSTION ENGINE

[75] Inventors: Klaus Wenzlawski, Nürnberg; Arno Friedrich, Regensburg, both of Germany

[73] Assignee: Siemens Aktiengesellschaft, Munich, Germany

[21] Appl. No.: 09/160,868

[22] Filed: Sep. 25, 1998

Related U.S. Application Data

[63] Continuation of application No. PCT/DE97/00405, Mar. 4, 1997.

[51] Int. Cl.[6] .............................. F02D 41/22; F02D 41/38
[52] U.S. Cl. .................. 123/479; 73/119 A; 123/406.14; 123/481
[58] Field of Search ............................... 123/406.14, 435, 123/479, 481; 73/35.03, 35.06, 35.11, 116, 117.3, 119 A; 701/111

[56] References Cited

U.S. PATENT DOCUMENTS

| | | | |
|---|---|---|---|
| 4,040,294 | 8/1977 | Matsuda et al. | 73/117.3 |
| 4,487,184 | 12/1984 | Boning et al. | 123/435 |
| 5,005,549 | 4/1991 | Pernpeintner et al. | 123/479 |
| 5,040,510 | 8/1991 | Krebs et al. | 123/406.37 |
| 5,339,245 | 8/1994 | Hirata et al. | 123/435 X |
| 5,837,887 | 11/1998 | Shibata et al. | 73/35.11 |

*Primary Examiner*—Tony M. Argenbright
*Attorney, Agent, or Firm*—Herbert L. Lerner; Laurence A. Greenberg

[57] ABSTRACT

A method for detecting irregular combustion processes in a multicylinder diesel internal combustion engine includes detecting incorrect injections and non-injections by recording combustion noise in individual cylinders through the use of one or more structure-borne noise sensors. Subsequently, a check is performed as to whether or not sensor signals exceed threshold values individual to each cylinder within or outside fixed measurement windows.

11 Claims, 3 Drawing Sheets

METHOD FOR DETECTING IRREGULAR COMBUSTION PROCESSES IN A MULTICYLINDER DIESEL INTERNAL COMBUSTION ENGINE

CROSS-REFERENCE TO RELATED APPLICATION

This application is a continuation of copending International Application No. PCT/DE97/00405, filed Mar. 4, 1997, which designated the United States.

BACKGROUND OF THE INVENTION

Field of the Invention

The invention relates to a method for detecting irregular combustion processes in a multicylinder diesel internal combustion engine by evaluating combustion noise through the use of a structure-borne noise sensor.

Injection systems in diesel internal combustion engines serve the function of introducing fuel, as finely atomized as possible, into a combustion space in a very short time. The higher the injection pressure, the better the mixture formation, and consequently the lower the fuel consumption and smoke emission. Injection systems at the present state of development, so-called common-rail systems, work with injection pressures of up to 1500 bar and are formed essentially of a high-pressure pump, a pressure accumulator, injectors and an electronic control device together with necessary sensors.

A problem which arises in such injection systems that are activated individually for each cylinder is that the operating behavior of the internal combustion engine, in particular the exhaust gas behavior, is adversely influenced by incorrect activation, for example at incorrect times, or by non-activation due to an absence of a flow of current to individual or to a plurality of injectors.

SUMMARY OF THE INVENTION

It is accordingly an object of the invention to provide a method for detecting irregular combustion processes in a multicylinder diesel internal combustion engine, which overcomes the hereinafore-mentioned disadvantages of the heretofore-known methods of this general type and with which irregular combustions due to incorrect injections or the absence of combustions in a multicylinder diesel internal combustion engine can be detected, in a simple and cost-effective way.

With the foregoing and other objects in view there is provided, in accordance with the invention, a method for detecting irregular combustion processes in a multicylinder diesel internal combustion engine, which comprises individually recording combustion noises for each cylinder within predeterminable measurement windows through the use of at least one structure-borne noise sensor supplying structure-borne noise signals; comparing the individual structure-borne noise signals for each cylinder with individual threshold values assigned to the cylinders; if the threshold values are exceeded, checking if the structure-borne noise signals exceed the threshold values within or outside the measurement windows; and inferring incorrect injections of injectors of an injection device when the threshold values outside the measurement windows are exceeded.

In accordance with another mode of the invention, there is provided a method which comprises inferring correct combustion when the threshold values within the measurement windows are exceeded.

In accordance with a further mode of the invention, there is provided a method which comprises individually rectifying and amplifying the signals from the structure-borne noise sensor for each cylinder, with an amplification factor variable in steps or continuously, before being processed further in an engine control device.

In accordance with an added mode of the invention, there is provided a method which comprises inferring non-injections when the threshold values within the measurement windows are not exceeded for the individual cylinders in the case of maximum amplification.

In accordance with an additional mode of the invention, there is provided a method which comprises initiating engine protection measures, such as reduction of activation time or suppression of activating pulses for the injectors, when incorrect injections are detected.

In accordance with yet another mode of the invention, there is provided a method which comprises using an acceleration sensor working on the piezoelectric principle as a structure-borne noise sensor.

In accordance with yet a further mode of the invention, there is provided a method which comprises covering a range before top dead center to after top dead center with the measurement windows.

In accordance with yet an added mode of the invention, there is provided a method which comprises filing the measurement windows in characteristic maps, individual to each cylinder, of a memory of an electronic engine control device.

In accordance with a concomitant mode of the invention, there is provided a method which comprises providing a plurality of structure-borne noise sensors, and assigning a specific number of cylinders of an internal combustion engine to each respective sensor.

It is possible to detect both insufficient combustion processes, for example due to incorrect activations of the injectors, and the complete failure of one or more injectors, by evaluating the combustion noise in the combustion spaces of the individual cylinders, through the use of structure-borne noise analysis. In particular, engine protection measures can then be taken when incorrect injections are detected.

Other features which are considered as characteristic for the invention are set forth in the appended claims.

Although the invention is illustrated and described herein as embodied in a method for detecting irregular combustion processes in a multicylinder diesel internal combustion engine, it is nevertheless not intended to be limited to the details shown, since various modifications and structural changes may be made therein without departing from the spirit of the invention and within the scope and range of equivalents of the claims.

The construction and method of operation of the invention however, together with additional objects and advantages thereof will be best understood from the following description of specific embodiments when read in connection with the accompanying drawings.

DESCRIPTION OF THE PREFERRED EMBODIMENTS

Figure 1:
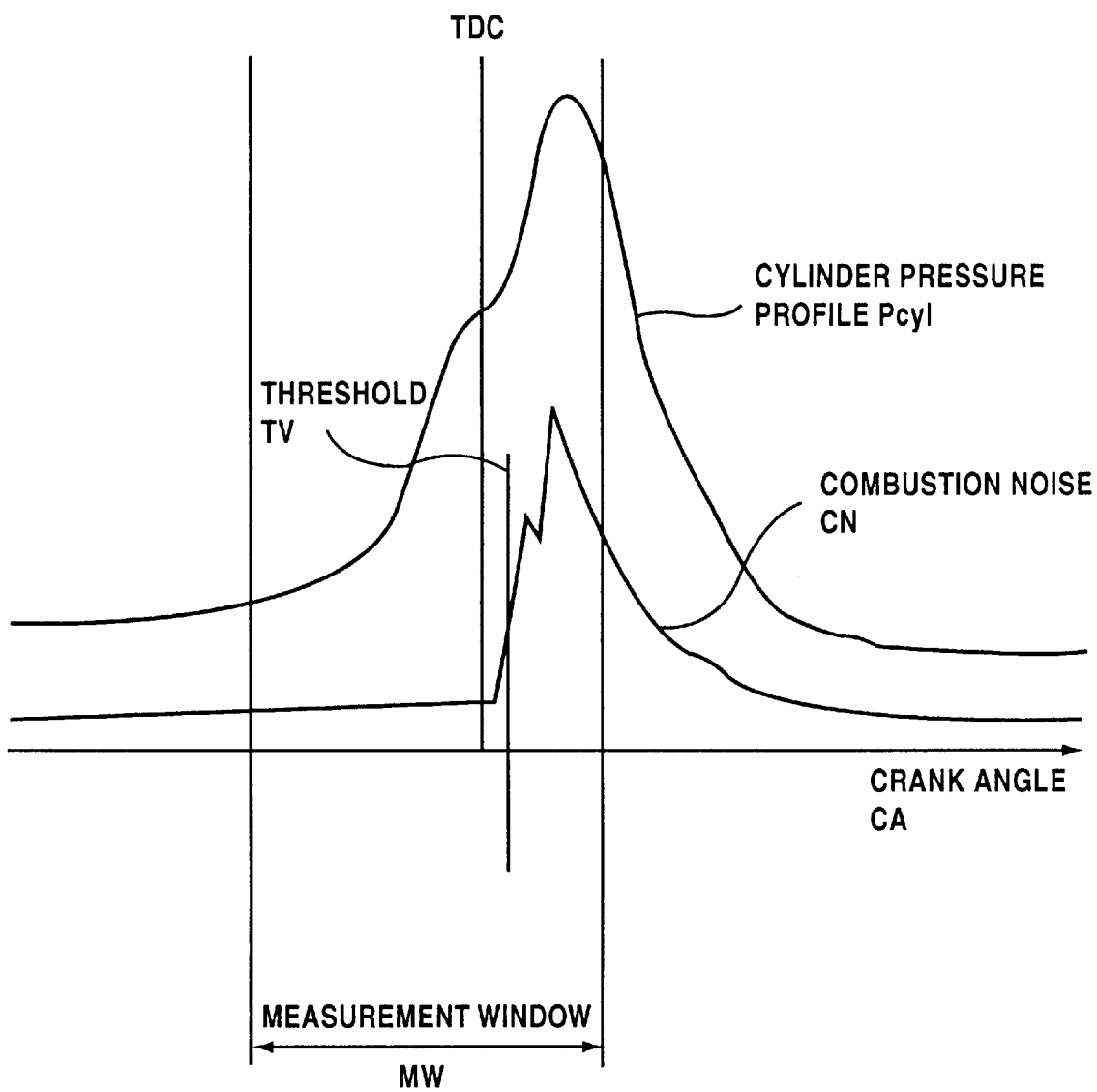
FIG. 1 is a graph showing qualitative profiles of pressure and combustion noise within a cylinder as a function of crank angle.

Referring now to the figures of the drawings in detail and first, particularly, to FIG. 1 thereof, there is seen a qualitative illustration of a typical profile of a pressure Pcyl in a cylinder of a diesel internal combustion engine as a function of a crank angle. A top dead center is designated, in this case by reference symbol TDC. An associated profile of combustion noise CN in this cylinder is plotted as a further curve. The occurrence of this combustion noise is used to detect faulty or absent combustion processes. For this purpose, a structure-borne noise sensor is fastened at a suitable point to the cylinder block of the internal combustion engine and records characteristic knocking vibrations in the combustion chambers of the individual cylinders. The sensor converts these vibrations into electric signals which are supplied for further processing to an electronic engine control device. In this case, a knock sensor, that is to say an acceleration sensor working on the piezoelectric principle, may advantageously be used as the structure-borne noise sensor.

Figure 2:
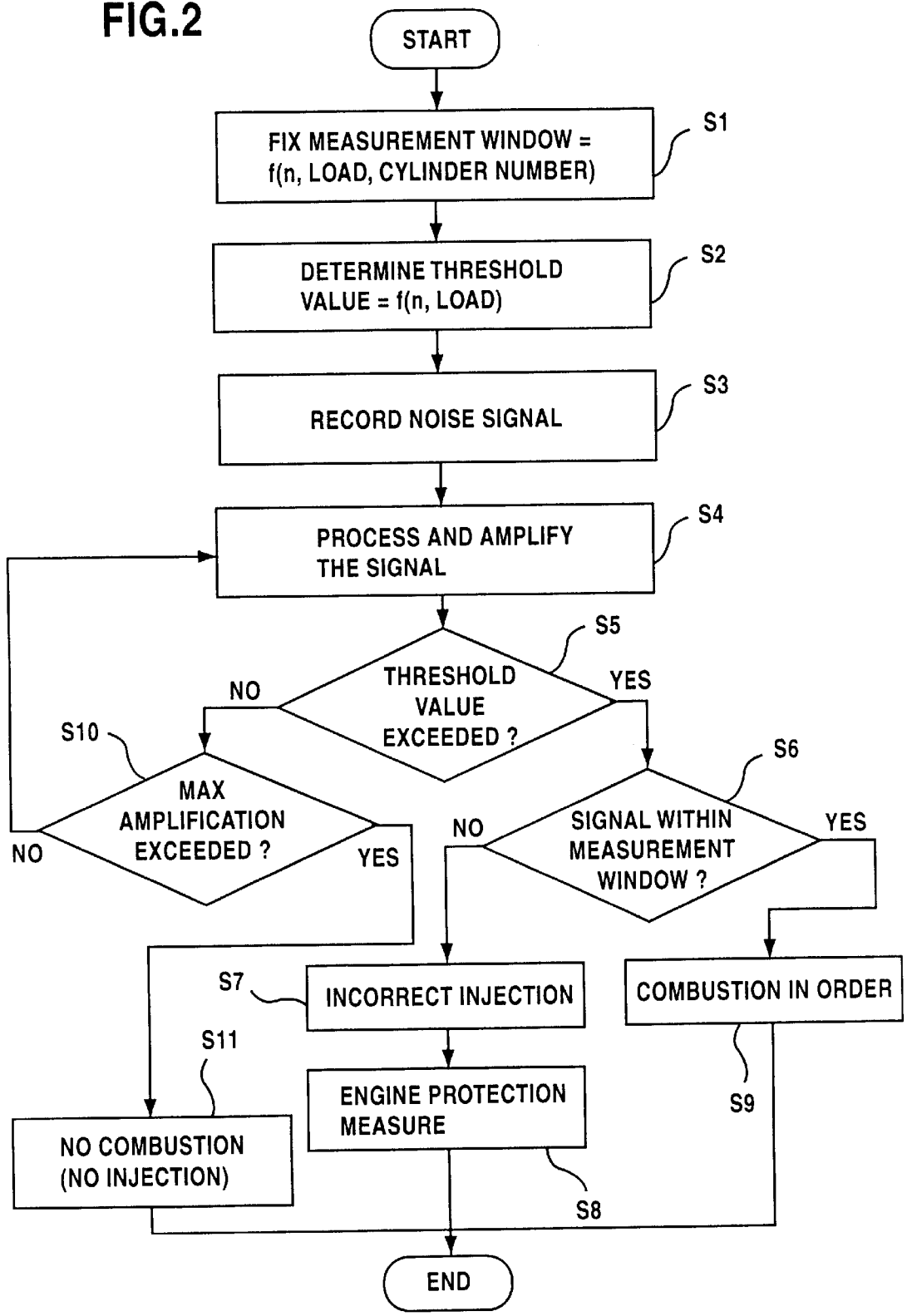
FIG. 2 is a flow diagram of a method sequence for determining irregular combustion processes.

Such a knock sensor is known, for example, from German Utility Model G 87 06 781.1. If only a single knock sensor is used, its mounting location must be selected as being as central as possible on the engine housing. In order to increase the accuracy of the evaluation of the knock signals from the individual cylinders in the case of internal combustion engines having 6, 8 or 12 cylinders, 2 or more knock sensors may be used. Those sensors are disposed at corresponding locations on the engine housing, with a definite assignment between the sensors and the cylinders being laid down. The method, which takes place individually for each cylinder, is explained with reference to the flow diagram according to FIG. 2.

The combustion noise and the knocking signal derived therefrom are measured and evaluated individually for each cylinder within a predeterminable measurement window MW, for example within the range of a crank angle of 45° before TDC to a crank angle of 15° after TDC.

Therefore, in a first method step S1, a measurement window $MW_{1...z}$ is fixed as a function of the engine speed n, the load of the internal combustion engine and the cylinder number z. Due to the transit time of the combustion noise from the point of origin in the respective cylinder to the location of detection by the sensor, the measurement windows are filed in characteristic maps, which are individual to each cylinder, within a memory of the engine control device.

A threshold value $TV_{1...z}$ is fixed for each cylinder $Cyl_{1...z}$ as a function of the engine speed and load (in a method step S2), and these values are likewise filed in a memory. In a method step S3, the noise signal from the structure-borne noise sensor is recorded, subsequently processed (rectified) and amplified through the use of a signal amplifier that is individual to each cylinder (in a method step S4). In this case, the amplification may be varied either in steps or continuously. This ensures that an evaluatable signal profile is available within a predetermined range under all of the operating conditions of the internal combustion engine.

In a method step S5, the structure-borne noise signal which is individual to each cylinder is compared with the respective associated threshold value $TV_{1...z}$ (FIG. 1). If the threshold value is exceeded, a check is subsequently made as to whether or not the signal from the sensor is also within the fixed measurement window $MW_{1...z}$ (in a method step S6). If this is not so, in a method step S7 incorrect injection is inferred and engine protection measures, such as, for example, reduction of the activation time or suppression of the activating pulse for this injector, can be initiated (in a method step S8).

If the signal $KS_{1...z}$ recorded by the knock sensor exceeds the threshold value $TV_{1...z}$ within the measurement window $MW_{1...z}$, correct combustion is inferred in this cylinder $Cyl_{1...z}$ (in a method step S9). The signal $KS_{1...z}$ obtained in this way from the knock sensor may be used to determine the start of combustion in the respective cylinder and employed for other control measures, for example for regulating the start of combustion.

If the result of the interrogation in the method step S5 is that the signal $KS_{1...z}$ from the sensor is below the threshold value $TV_{1...z}$, a check is made, in a method step S10, as to whether or not the maximum amplification of the sensor signal is already exceeded. If this is so, the absence of combustion and consequently non injection are inferred in a method step S11. Otherwise, method steps S4, S5 and S10 are repeated until either the threshold value is exceeded or the interrogation in the method step S10 gives a positive result.

Figure 3:
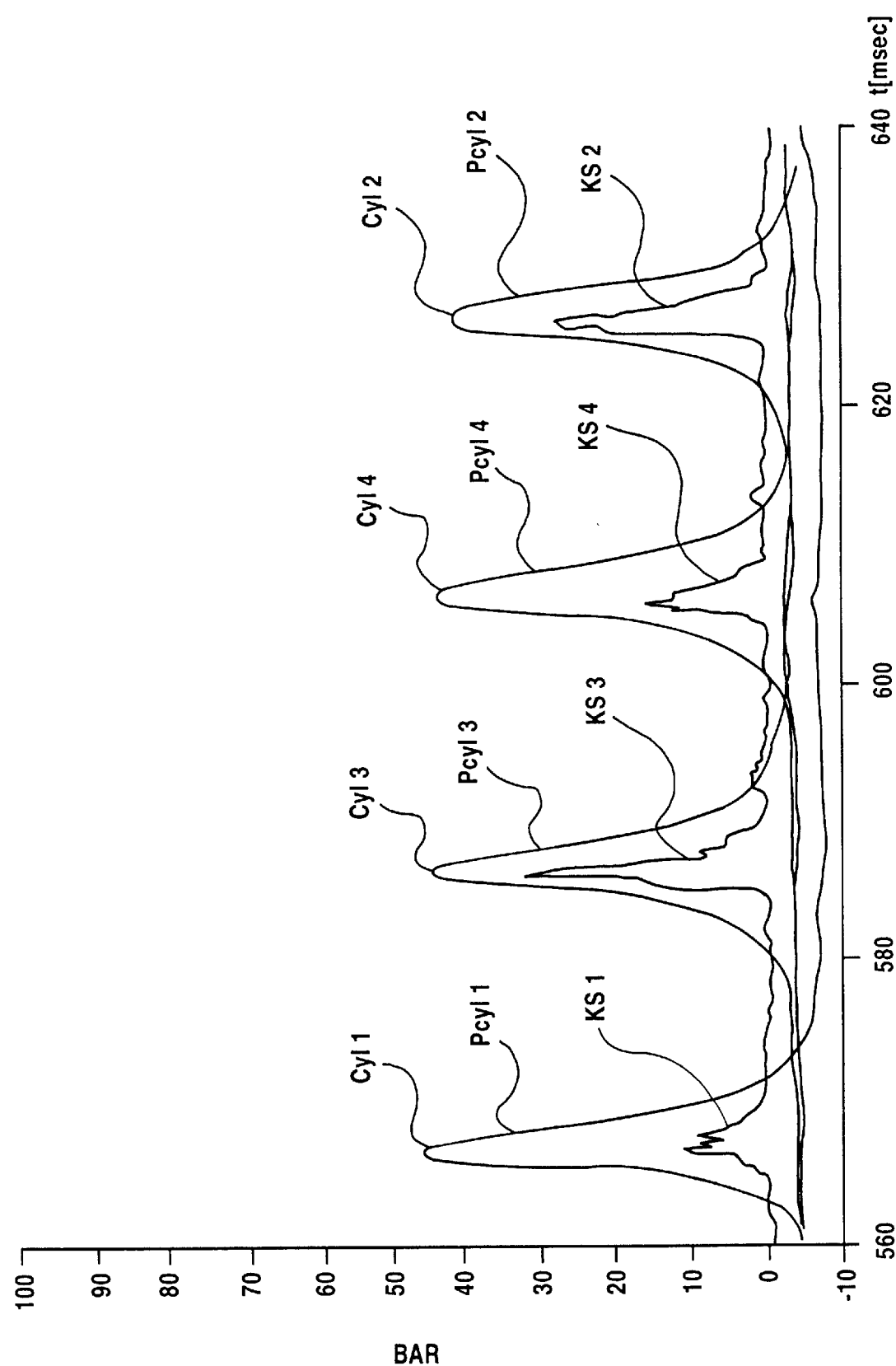
FIG. 3 is a measurement diagram of cylinder pressures and corresponding signals of a knock sensor in a 4-cylinder internal combustion engine.

FIG. 3 shows a diagram obtained by measurements on an internal combustion engine having 4 cylinders $Cyl_{1...4}$ at 1500 revolutions per minute. The profiles of the cylinder pressures $Pcyl_{1...4}$ and the associated signals $KS_{1...4}$ from the knock sensor are illustrated according to an ignition sequence 1-3-4-2.

We claim:

1. A method for detecting irregular combustion processes in a multicylinder diesel internal combustion engine, which comprises:

individually recording combustion noises for each cylinder within predeterminable measurement windows through the use of at least one structure-borne noise sensor supplying structure-borne noise signals;

comparing the individual structure-borne noise signals for a each cylinder with individual threshold values assigned to the cylinders;

if the threshold values are exceeded, checking if the structure-borne noise signals exceed the threshold values within or outside the measurement windows; and inferring incorrect injections of injectors of an injection device when the threshold values outside the measurement windows are exceeded.

2. The method according to claim 1, which comprises inferring correct combustion when the threshold values within the measurement windows are exceeded.

3. The method according to claim 1, which comprises individually rectifying and amplifying the signals from the structure-borne noise sensor for each cylinder, with an amplification factor variable in steps or continuously, before being processed further in an engine control device.

4. The method according to claim 3, which comprises inferring non-injections when the threshold values within the measurement windows are not exceeded for the individual cylinders in the case of maximum amplification.

5. The method according to claim 1, which comprises initiating engine protection measures when incorrect injections are detected.

6. The method according to claim 1, which comprises initiating a reduction of activation time when incorrect injections are detected.

7. The method according to claim 1, which comprises initiating suppression of activating pulses for the injectors when incorrect injections are detected.

8. The method according to claim 1, which comprises using an acceleration sensor working on the piezoelectric principle as a structure-borne noise sensor.

9. The method according to claim 1, which comprises covering a range before top dead center to after top dead center with the measurement windows.

10. The method according to claim 1, which comprises filing the measurement windows in characteristic maps, individual to each cylinder, of a memory of an electronic engine control device.

11. The method according to claim 1, which comprises providing a plurality of structure-borne noise sensors, and assigning a specific number of cylinders of an internal combustion engine to each respective sensor.

* * * * *